United States Patent [19]
Sakumoto et al.

[11] Patent Number: 5,101,304
[45] Date of Patent: Mar. 31, 1992

[54] CASSETTE HOLDER DEVICE CAPABLE OF PREVENTING ERRONEOUS INSERTION OF CASSETTE

[75] Inventors: Hideki Sakumoto, Katano; Machiko Hirano, Moriguchi, both of Japan

[73] Assignee: Matsushita Electric Industrial Co., Ltd., Osaka, Japan

[21] Appl. No.: 606,824

[22] Filed: Oct. 31, 1990

Related U.S. Application Data

[62] Division of Ser. No. 422,550, Oct. 17, 1989.

[30] Foreign Application Priority Data

Oct. 31, 1988 [JP] Japan .................................. 63-274882
Oct. 31, 1988 [JP] Japan .................................. 63-274883

[51] Int. Cl.⁵ ........................................... G11B 15/00
[52] U.S. Cl. ............................................... 360/96.5
[58] Field of Search ...................... 360/96.5, 94, 96.6

[56] References Cited

U.S. PATENT DOCUMENTS

| | | | |
|---|---|---|---|
| 3,703,295 | 11/1972 | Yamamoto et al. | 360/94 |
| 4,864,439 | 9/1989 | Duurland | 360/96.5 |
| 4,868,924 | 9/1989 | Ando et al. | 360/96.5 |
| 4,918,550 | 4/1990 | Baranski | 360/94 |

FOREIGN PATENT DOCUMENTS

| | | |
|---|---|---|
| 201699 | 3/1986 | European Pat. Off. |
| 286751 | 4/1987 | European Pat. Off. |
| 274544 | 7/1987 | European Pat. Off. |
| 288165 | 3/1988 | European Pat. Off. |
| 334257 | 3/1989 | European Pat. Off. |
| 3626939 | 8/1986 | Fed. Rep. of Germany |
| 3626941 | 8/1986 | Fed. Rep. of Germany |
| 8904539 | 5/1989 | World Int. Prop. O. |

*Primary Examiner*—David J. Severin
*Attorney, Agent, or Firm*—Stevens, Davis, Miller & Mosher

[57] ABSTRACT

Provided is a cassette holder device in a tape recording apparatus having a body, which receives either one or more than two kinds of tape cassettes having different sizes, and loads thereof in the tape recorder body, comprising: a cassette holder member, having an insertion opening, for storing and holding therein a large size tape cassette; and a small size tape cassette guide member disposed rotatably so that it can project into the insertion opening of the cassette holder member from above the latter, having one of side surfaces facing one of side surfaces of an inserted small size cassette with a slight gap therebetween so as to regulate and guide the position of insertion of the small size tape cassette, the one side surface of the small tape cassette guide member guiding the one side surface of the small size tape cassette so as to introduce the latter into the holder member while the guide member is rotated upward by insertion force of a large size tape cassette which is inserted into the insertion opening of the holder member and is therefore retracted outside of an insertion path of the large size tape cassette.

2 Claims, 12 Drawing Sheets

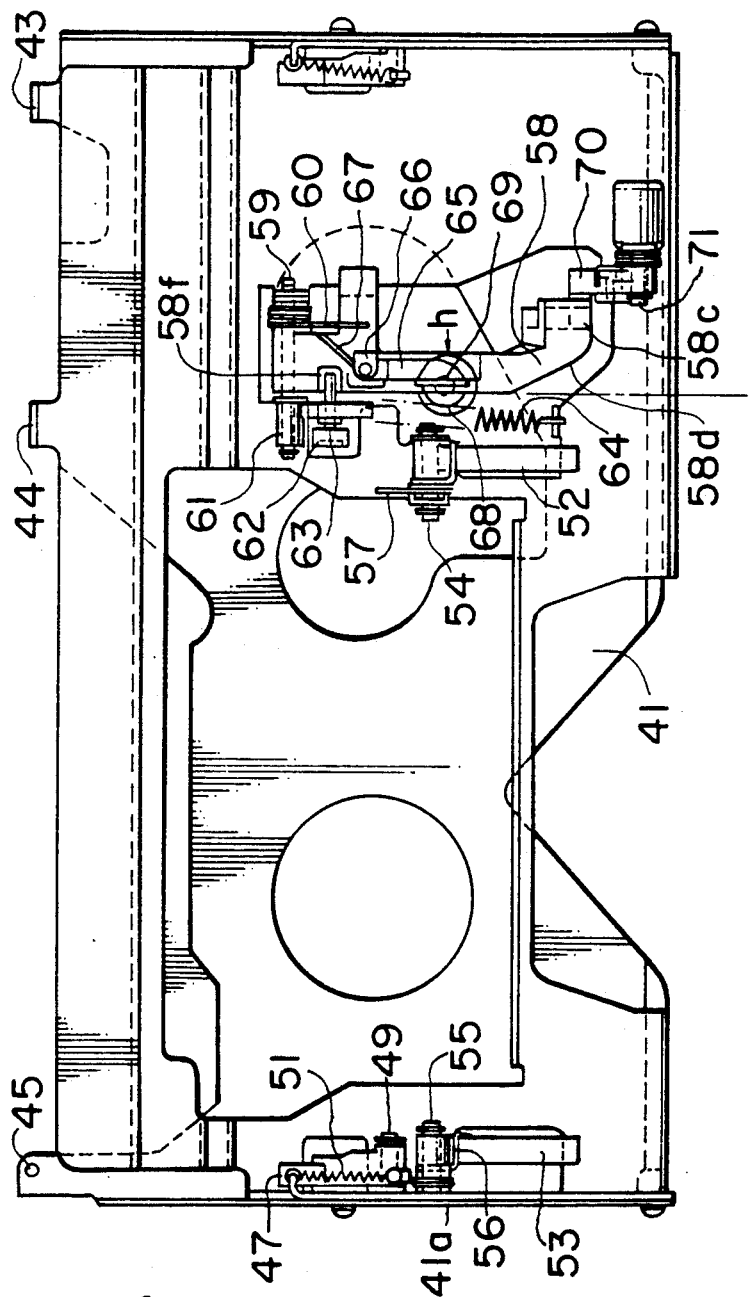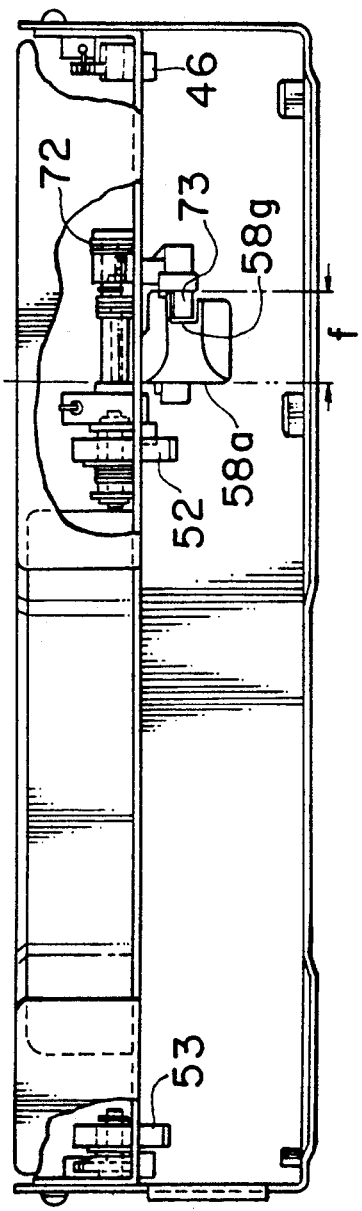
FIG. IA
FIG. IB

CASSETTE HOLDER DEVICE CAPABLE OF PREVENTING ERRONEOUS INSERTION OF CASSETTE

This is a division of application Ser. No. 422,550 filed Oct. 17, 1989.

BACKGROUND OF THE INVENTION

The present invention relates to a cassette holder device for tape recorders, and particularly to a cassette holder device which is adapted for receiving two kinds of cassettes, that is large size cassettes and small size cassettes.

A conventional cassette holder device having a mechanism for preventing an erroneous insertion of a cassette tape will be described below by referring to the drawings.

FIG. 8 is a rear side view of a large size cassette tape (hereinafter, referred to simply to a large size cassette). In the figure, a large size cassette 1 is formed with a guide groove 2 on its rear surface and includes a supply reel 3 and a take-up reel 4.

FIG. 9 is a rear side view of a small size cassette tape (hereinafter, referred to simply as a small size cassette). In the figure, a small size cassette 5 is formed with a guide groove 6 on its rear surface and includes a supply reel 7 and a take-up reel 8.

FIGS. 10A and 10B show a positional relation between large size cassette 1 and small size cassette 5 in a cassette holder. From these figures, it is seen that, when the left side edges of large size cassette 1 and of small size cassette 5 are aligned with each other, the positions of guide grooves 2 and 6 are also coincident with each other.

FIG. 12 and FIG. 13 show perspective views of large size cassette and small size cassette, respectively. In FIG. 12, the two reels contained in large size cassette 1 of a box shape include respective flanges 29 and 30. A lid 31 for normally covering a tape stretching portion on the front surface of cassette is urged in a lid closing direction by means of a spring (not shown), and is formed with a slant surface 31b on the upper front portion thereof. Grip grooves 32 and 33 are formed in rear side surfaces of large size cassette 1. In FIG. 13, the reels contained in small size cassette 5 have respective flanges 35 and 36. Grip grooves 37 and 38 are formed on rear side surfaces of small size cassette 5. Further, a front lid 39 for protecting the tape stretching on cassette front surface and a rear lid 40 for similarly protecting the tape stretching portion are provided and are urged in lid closing directions by means of respective springs (not shown). Front lid 39 is formed with a slant surface 39a on its upper front portion, and a step portion 40a is defined by front lid 39 and rear lid 40.

FIGS. 11A and 11B show a conventional cassette holder. In the figure, numeral 9 denotes a cassette holder member for accommodating large size cassette 1 or small size cassette 5 so as to supply and receive each of them and from an apparatus such as a video tape recorder (not shown). On cassette holder member 9 is fixed a guide member 11 by caulking, for guiding a cassette when a cassette is inserted, and preventing erroneous insertion of the cassette. On the upper portion of cassette holder member 9 is screwed a top plate 10, thereby forming a box shape as a whole. On the upper side of top plate 10, there are provided three mechanisms for preventing large size cassette 1 or small size cassette 5 from floating up when loaded in the body of an apparatus. The first mechanism is a cassette urging lever 12 swingable about a pin 13 and downwardly urged by means of a spring 14. The second mechanism comprises a cassette urging lever 15 located at a position corresponding to the left upper portion of large size cassette 1 or small size cassette 5. Cassette urging lever 15 of this second mechanism is also swingable about a pin 16 and downwardly urged by means of a spring 17. The third mechanism is a cassette urging lever 18 located at a position corresponding to the substantially central portion of large size cassette 1 and to the right upper portion of small size cassette 5. Cassette urging lever 18 is swingable about a pin 19 and downwardly urged by means of a spring 20. A roller 21 is located at a position corresponding to the upper portion of large size cassette 1 or small size cassette 5 and rotatably supported by a lever 18 through the intermediary of a pin 22. Among cassette stoppers 25, 26, and 27, the stoppers 25 and 26 are formed integrally with cassette holder 9, while the stopper 27 is a separate member fixed to cassette holder 9 by cauking a pin. These stoppers 25, 26, and 27 limit the insertion extent of the cassettes.

The cassette 1 or 5 is, when loaded into the apparatus not shown, supported by reference pins provided on a chassis and adapted to engage with reels 3 and 4 in large size cassette or reels 7 and 8 in small size cassette 5, and is pushed downwards against these reference pins by cassette retaining levers 12, 15 and cassette retaining roller 21 with the lower surface of the cassette apart from the chassis. Thus, cassettes can be positioned and held. Accordingly, the opening of cassette holder member 9 for introducing cassette 1 or 5 has a hight greater than the depth of cassette 1 or 5.

As mentioned above in a cassette holder device of prior art, whether cassette insertion is correct or erroneous is judged by whether the engagement between guide groove 2 or 6 formed in the lower surface of cassette and cassette guide 11 fixed to cassette holder member 9 is normal or not. Namely, in case of erroneous insertion of a cassette, the insertion is impossible because of an erroneous insertion of a cassette, the insertion is impossible because of abutting of the cassette side surface against the tip of cassette guide 11.

However, in the conventional device, in order to surely preventing erroneous insertion of a cassette, it is required to make the depth of guide groove 2 or 6 deeper and the hight of cassette guide 11 higher for producing an engagement between the cassette side surface and the cassette guide in a wide range. These structural features cause an increased depth of cassette, because the provision of a deeper guide groove is required in a cassette in addition to reels for winding a tape. On the other hand, it is desired to make the depth of cassette minimum for assuring an easier handling and a convenient storing of a cassette.

As mentioned above, in the prior art there is a restriction on minimizing the depth of guide groove 2, 6 and the depth of cassette guide 11. Upon erroneous insertion of cassette by a great force, it may happen for the cassette to be pushed by force with the cassette riding on cassette guide 11 due to the above-mentioned rather wide clearance between the size of the cassette insertion opening of cassette holder member 9 and the size of the cassette, or due to deformation of the bottom surface of the cassette holder member 9 (on which cassette guide 11 is disposed). In such erroneous operation, it become difficult to take out the forcedly inserted cassette, and further, when an operation for loading the cassette holder member 9 into the recorder apparatus is carried out in force, there may be occur destructions of the cassette holder and even the apparatus body, because the cassette holder member can not be engaged correctly with reel beds or tape guide post (not shown) both arranged in the apparatus body.

A cassette frame is, in general, made from a plastic material by molding process, and is inferior in strength at the central portion thereof due to the structural feature of the frame. The top plate 10 of the shown prior art includes three cassette retainers 12, 15, and 18 for urging large size cassette 1 or small size cassette 5 against the chassis.

In this arrangement, when a large size cassette is used, the cassette urging roller 21 for pushing the right upper portion of a small size cassette 5 abuts against a part near the central portion of large cassette 1 where the strength of cassette 1 is inferior. This pushing force of roller 21 causes deformation of cassette 1 and inclination of a guide post arranged in the cassette, thereby finally giving an adverse effect on the running of tape.

When a cassette is loaded into the apparatus body, lids 31, 39 provided on the cassette are required to be opened against the spring forces usually urging the lids to their closed position. These spring forces act on the cassette in a direction opposite to the cassette insertion direction, thereby causing a risk that the cassette is not inserted into a regular position. As mentioned before, a cassette is required to be inserted to a position defined by stopper 25, 26, 27. A positional deviation of the cassette in the above-mentioned opposite direction may cause an adverse effect on the tape running, because the cassette is not located in a correct position in the apparatus when the cassette holder is loaded into the apparatus. For preventing a positional deviation of a cassette, there are provided rather greater pushing forces for pushing cassette retaining levers 12, 15 and cassette urging roller 21. However, this solution has a disadvantage that the force required for insertion of cassette become greater accompanied by an insertion feeling uncomfortable. Further, when a small size cassette is no fully inserted into the holder with its rear edge not abutting against stoppers 26 and 27, destructions of the apparatus body and the cassette may be caused. In addition, due to the frictional sliding between the upper surface of the cassette and the retaining levers 12 and 15, the surface of the cassette suffers scratches, and the swarf produced thereby may fall into the inside of the apparatus body, possibly causing dropouts of some of reproduced signals.

Further, since the cassette is required to be formed with a guiding groove 6 on its lower surface, the strength of the cassette is decreased and distortion in a molding process are apt to be caused, thereby deteriorating appearance and shape accuracy of the cassette. In addition, as mentioned before, the thickness of the cassette become greater due to the guide groove, resulting in a disadvantageous cassette size.

SUMMARY OF THE INVENTION

The present invention is devised in view of the above-mentioned problems inherent in the prior art.

Accordingly, a first object of the present invention is to provide a cassette holder for tape recorders in which a cassette is inserted precisely at a regular position, and which prevents a cassette from being erroneously inserted in an inverted posture.

Further, a second object of the invention is to provide a cassette holder which can prevent a large size cassette from receiving a large load exerted by a small size cassette retaining roller upon insertion of the large size cassette.

Further, a third object of the invention is to provide a cassette holder in which a cassette will not shift accidentally from its regular position during the cassette being loaded on the body of a tape recorder by the cassette holder device.

To the end, according to a first aspect of the present invention, there is provided a cassette holder for tape recorders, in which erroneous insertion preventing lever is rotatably mounted on the cassette holder at a position corresponding to the slant surface formed on the upper front surface of the cassette and is urged downwards toward the cassette so that it can project into the insertion opening of the cassette holder member from above the latter, and the erroneous insertion preventing lever is formed on the lower side thereof with a pawl or a step which includes a surface substantially parallel to the front surface of the inserted cassette.

Further, in the cassette holder device according to the present invention, the erroneous insertion preventing lever is formed with an arcuate projection at a position deeper in the cassette holder device in comparison with the pawl or step of the erroneous insertion preventing lever so that, upon a regular insertion of a cassette, the pawl or step does not contact with the upper surface of the cassette.

In view of the first aspect of the present invention mentioned above, in a cassette holder device, in the case of regular insertion of a cassette, the erroneous insertion preventing lever is rotated upwards by cassette insertion force given by the slant surface formed on the upper front portion of the cassette to a position outside of an insertion path of the cassette. When a cassette is inserted, the arcuate projection of the erroneous insertion preventing lever makes contact with the upper surface of the cassette, while the pawl or step of the same lever is adapted to be apart from the upper surface of the cassette with a gap therebetween.

In erroneous insertion of a cassette, namely in an inverted posture with respect to the top and bottom or to the front and rear, what is opposite to the erroneous insertion preventing lever is not the slant surface of the cassette but the edge of the cassette. Therefore, the erroneous insertion preventing lever is not retracted upwards, but a surface formed on the erroneous insertion preventing lever in parallel to the front surface of the cassette abuts against the front surface of the cassette, thereby preventing a farther insertion of the cassette.

Further, in the case of using a cassette in which the slant surface is formed on only a part of the upper front portion of the cassette and steps are formed on the other parts, cassette insertion becomes possible only when the cassette is so located that the slant surface of the cassette is opposite to the erroneous insertion preventing lever. In consequence, in a cassette holder device capable of receiving a large size cassette and a small size cassette, erroneous insertion of a small size cassette having a lateral positional deviation can be prevented.

According to a second aspect of the present invention, there is provided a cassette holder device in a tape recording apparatus having a body, which receives either one of more than two kinds of tape cassettes having different sizes, and loads thereof in the tape recorder body, comprising:

a cassette holder member, having an insertion opening, for storing and holding therein a large size tape cassette; and a small size tape cassette guide member disposed rotatably so that it can project into the insertion opening of the cassette holder member from above the latter, having one of side surfaces facing one of side surfaces of an inserted small size cassette with a slight gap therebetween so as to regulate and guide the position of insertion of the small size tape cassette, the one side surface of the small tape cassette guide member guiding the one side surface of the small size tape cassette so as to introduce the latter into the holder member while the guide member is rotated upward by insertion force of a large size tape cassette which is inserted into the insertion opening of the holder member and is therefore retracted outside of an insertion path of the large size tape cassette.

Further, according to a specific form of the second aspect of the present invention, a pawl part is formed in the lower surface of the above-mentioned small size tape cassette guide member, which is adapted to be engaged with a stepped part formed in the small size tape cassette in order to inhibit the small size tape cassette from being positionally shifted.

According to another specific form of the second aspect of the present invention, a small cassette retaining roller is rotated in association with rotation of the small size tape cassette guide member so as to prevent an urging force exerted to the small size tape cassette retaining roller from being exerted to a large cassette upon insertion of the latter.

According to a further specific form of the second aspect of the present invention, a small size cassette locking member is rotatably provided on the side of the small size tape cassette guide member, which is adjacent to one side surface of an inserted small size tape cassette, so that the locking member is engaged with a recess in the small size tape cassette but is retracted outside of the insertion path of the large size tape cassette in association with rotation of the small size tape cassette guide member upon insertion of a large size tape cassette.

In view of the second aspect of the present invention, in case of a small size cassette insertion, the cassette is inserted at a regular position with one side surface of the cassette being guided by one side surface of cassette holder and the other side surface of the cassette being guided by the small size cassette guide member. It may be possible to provide two small size cassette guide members for guiding both sides of the small size cassette. In a small size cassette insertion having a small lateral positional deviation, the lateral position of the cassette is corrected by a cassette guide slant surface of the small size cassette guide member. In the case of a great positional deviation, although the small size cassette is rotated upwards by the front surface of the cassette similarly to the case of large size cassette insertion as will be mentioned later and insertion can be started, a pawl formed on the small size cassette guide member engages, after the small size cassette has been inserted by a small distance, with a step portion formed on the small size cassette, thereby preventing farther insertion of the cassette and assuring regular insertion.

In the case of large cassette insertion, a guide opener which is adapted to engage with the small size cassette guide member is rotated together with the latter to a position where cassette insertion is not hindered, enabling the cassette to be inserted. In this case, since the large size cassette is not formed with any step, which is provided only in a small size cassette, and the cassette is impossible to engage with a pawl of the small size cassette guide member, the small size cassette guide member is rotated further upwardly by a chamfer-like surface formed on the front portion of the large size cassette as making contact with the upper surface of the cassette in a sliding manner, and the cassette is inserted to a regular position. Further, according to the present invention, in the case of small size cassette insertion, a retaining lever used for both large size cassette and small size cassette and mounted on the cassette holder at the left side portion thereof retains one side of the small size cassette, while a small size cassette retaining roller retains the other side of the same. In the case of large cassette insertion, the small size cassette guide member and the small size cassette retaining roller which rotates in connection with the small size cassette guide member are both retracted upwards to positions apart from the upper surface of the cassette, and the large size cassette is retained by retaining levers provided above both sides of the cassette.

Further, according to the present invention, when small size cassette insertion is completed, a small size cassette locking roller engages with a grip groove formed on the small size cassette, thereby preventing the cassette from deviating from a regular position during the loading operation of the cassette into a recording apparatus body, such as cassette holder lowering action or cassette lid opening action.

BRIEF DESCRIPTION OF THE DRAWINGS

The above and further objects, features and advantages of the present invention will be more apparent from the following description of an embodiment form of the present invention with reference to the drawings in which:

FIGS. 1A to 1F are views illustrating one embodiment of a cassette holder device according to the present invention, FIG. 1A being a front view of the cassette holder device, FIG. 1B being a side view thereof observed in the cassette insertion direction, FIG. 1C being a side view showing a cassette guide member therein, FIG. 1D being a side view showing a cassette retaining member therein, FIG. 1E being a front view showing a small size tape cassette in part adapted to be inserted in the cassette holder device, and FIG. 1F is a front view showing a large size tape cassette in part adapted to be inserted in the cassette holder device;

DESCRIPTION OF PREFERRED EMBODIMENTS

The cassette holder device according to the present invention will be described below by referring to the accompanied drawings.

Figure 1C:
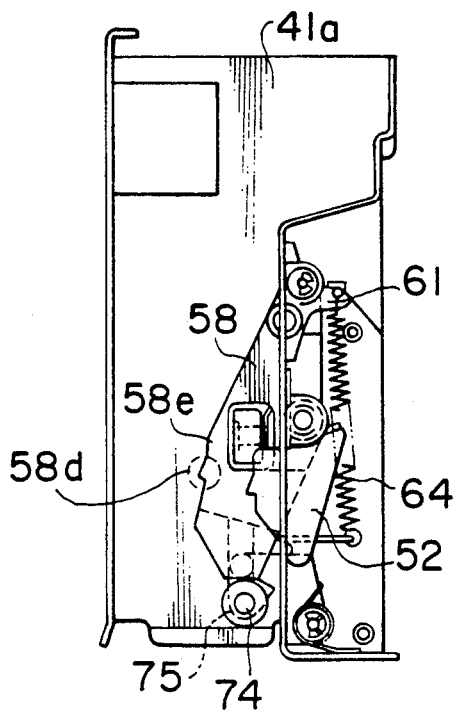
Figure 1D:
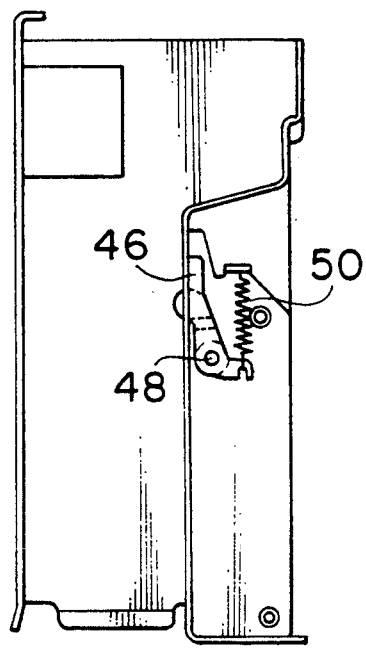
Figure 1E:
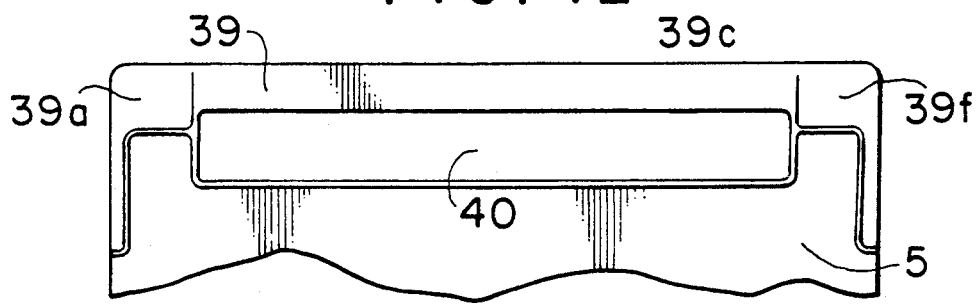
Figure 1F:
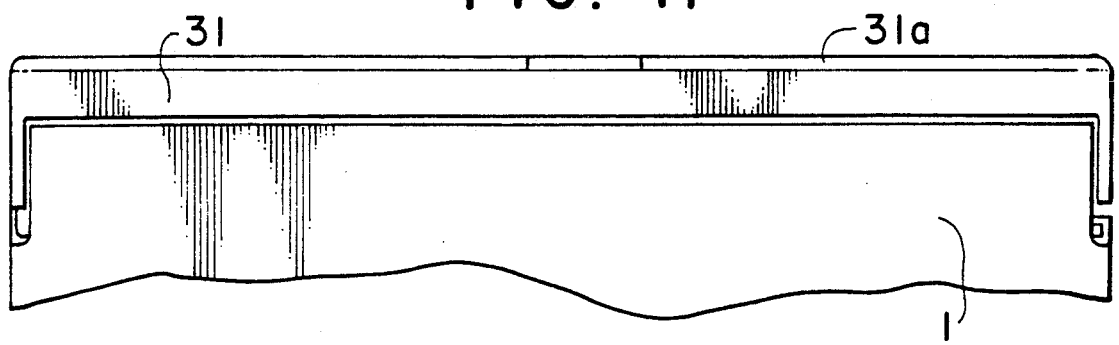
Figure 2:
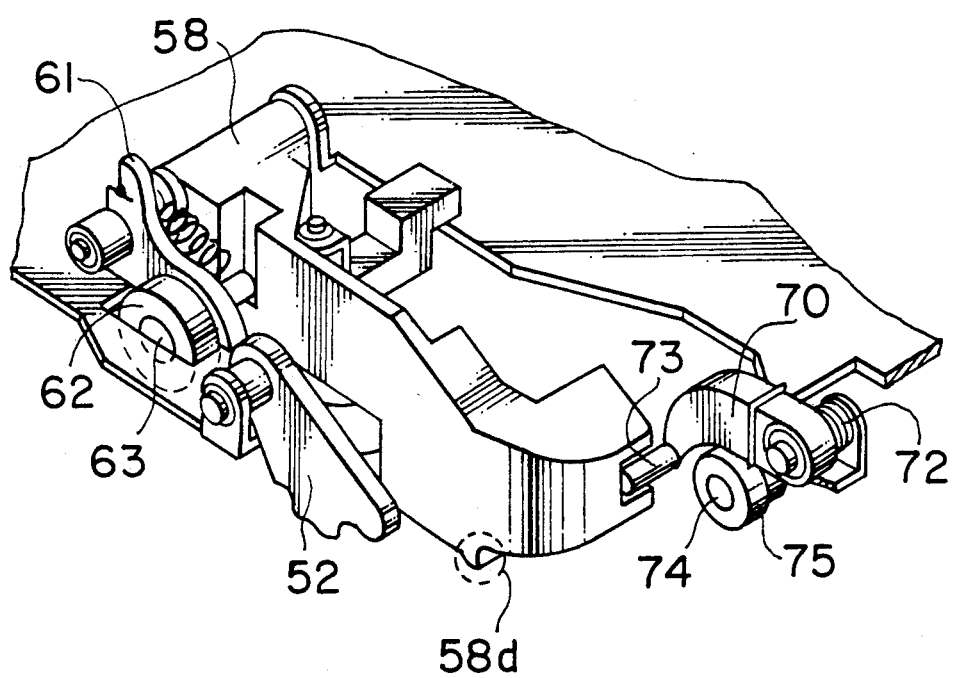
FIG. 2 is a perspective view illustrating the small size tape cassette guide member in part.

FIGS. 1 and 2 show a cassette holder device according to an embodiment of the present invention which is adapted for receiving two kinds of cassettes. In the figures, a cassette holder member 41 and a top plate 42 are assembled together by means of screws to form a box shape housing for receiving cassettes. Stoppers 43, 44, 45 are provided on cassette holder 41 for limiting the maximum depth of cassette insertion. Cassette retaining levers 46, 47 are rotatably mounted on top plate 42 by means of pins 48, 49, and urged towards the cassette by means of springs 50, 51, respectively. Erroneous insertion preventing levers 52, 53 for preventing erroneous insertion of a cassette are rotatably mounted on top plate 42 through pins 54, 56 and urged towards the cassette by means of springs 56, 57, respectively. The erroneous insertion preventing levels are so located as to engage with slant surfaces 39a, 39b of front lid 39 of small size cassette 5, when small size cassette is inserted into its regular position as shown in the figure.

A small cassette guide member 58 for guiding a small cassette 5 to its regular position is mounted on top plate 42 by means of a pin 59 with its side surface 58a apart from a side surface 41a of cassette holder 41 by a distance somewhat greater than the breadth of small size cassette, and urged towards the cassette (downwards) by means of a spring 60. For guiding a small size cassette to the regular position, even in such a that case the cassette is inserted with some positional deviation to the right side in the figure, small size cassette guide member 58 is formed with a slant surface portion 58b and a parallel surface portion 58c parallel to the front surface of the cassette. Further, small size cassette guide member 58 is formed with an arcuate surface 58e sliding on the upper surface of the cassette and a pawl 58d for stopping inserting operation in the case of erroneous insertion of the cassette.

A small size cassette retaining roller arm 61 is mounted on a support pin 59, and is mounted thereon by means of a pin 63 with a roller 62 making contact with the upper surface of the cassette. The pin 63 engages at one end thereof with a recess 58f formed in small size cassette guide member 58, and is adapted to be raised upwards in connection with a rotational motion of small size cassette guide member 58. Further, in order to apply a suitable urging force from roller 62 to the cassette, small size cassette retaining roller arm 61 is biased by means of a spring 64.

A small size cassette locking roller arm 65 is rotatably mounted on small size cassette guide member 58 by means of a pin 66, and is biased in the direction indicated in the figure with arrow A by means of a spring 67. On one end of locking roller arm 65 is rotatably mounted a small size cassette locking roller 68 by means of a pin 69. This locking device is so located that the locking roller 68 projects beyond the cassette guide surface 58a of small size cassette guide member 58.

A guide opener 70 is rotatably mounted on top plate 42 through a pin 71 and biased downwards by means of a spring 72. A projection 73 formed in guide opener 70 engages with a groove 58g formed at the tip of small size cassette guide member 58. As a result, small size cassette guide member 58 rotates upwards in connection with the motion of guide opener 70. On guide opener 70 is rotatably mounted an opener roller 75 by means of a pin 74 at a position near to the cassette opening where the opener roller firstly contacts with front portion 31a of the cassette.

Figure 3A:
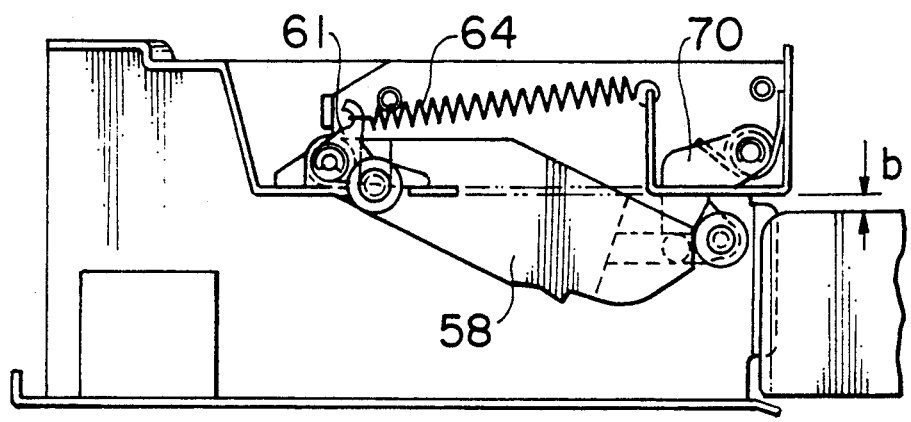
FIGS. 3A to 3C are views for explaining the operation of the small size tape cassette guide member.
Figure 3B:
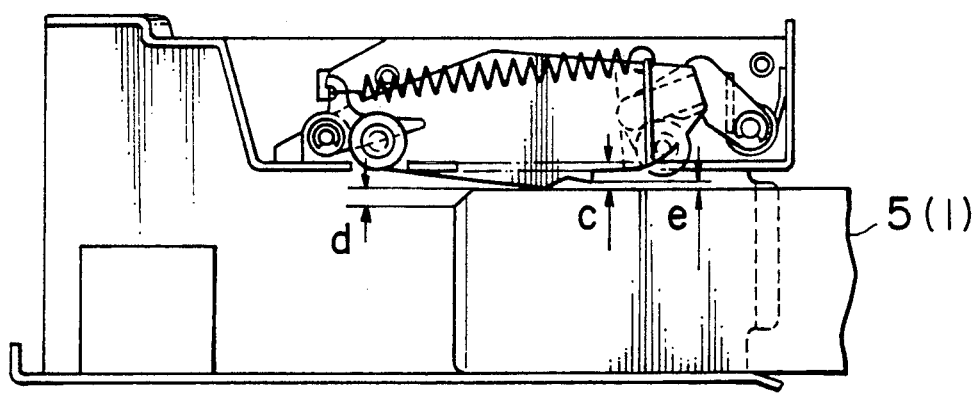
Figure 3C:
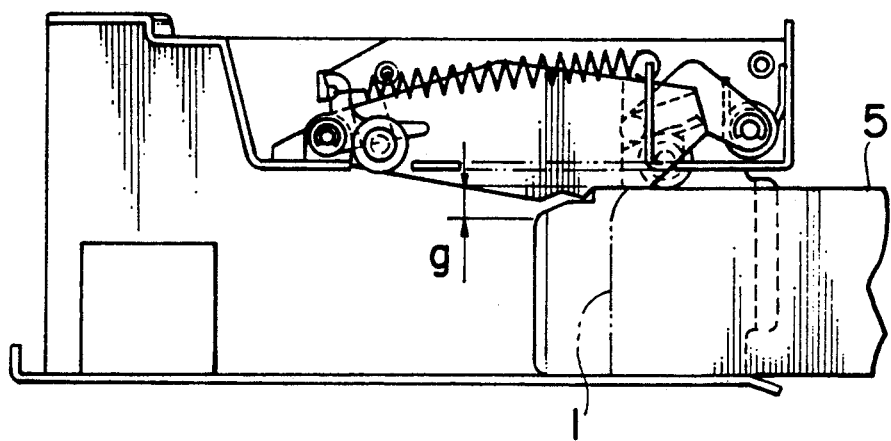
Figure 4A:
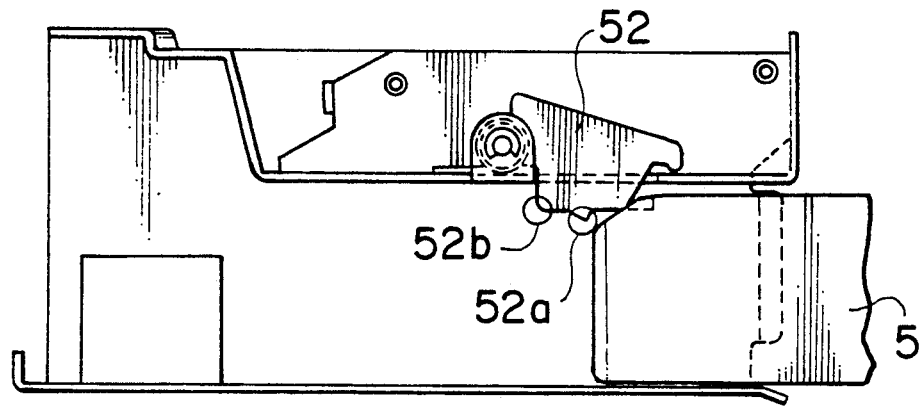
FIGS. 4A to 4C are views for explaining the operation of an erroneous insertion preventing lever in the cassette holder device.
Figure 4B:
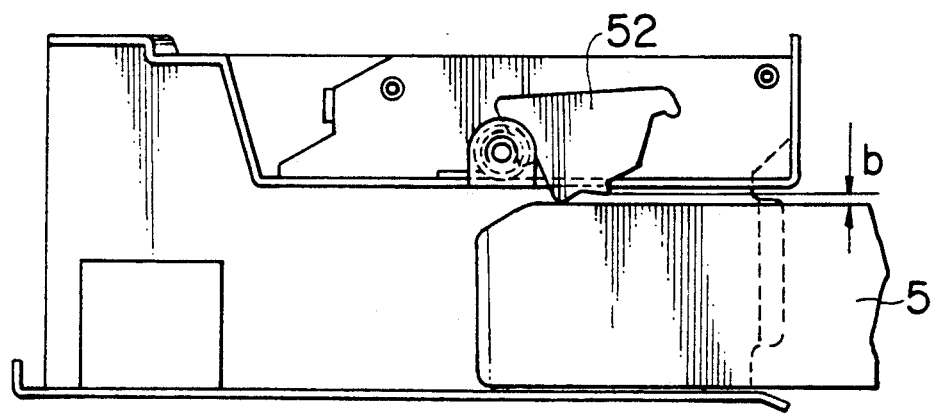
Figure 4C:
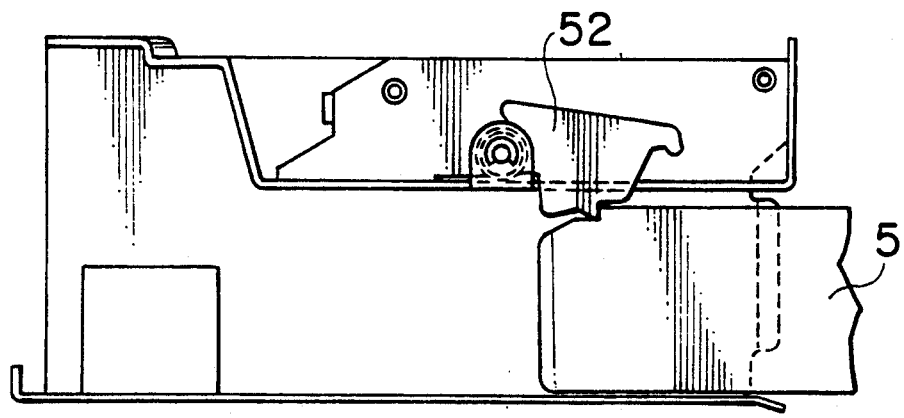

Referring to FIG. 3a through FIG. 4C, functions of the device will be described below. FIGS. 3A through 3C show inserting operation of cassette and motion of small size cassette guide member 58, guide opener 70 and small size cassette retaining roller arm 61, while FIGS. 4A through 4C show motion of erroneous insertion preventing levers 52, 53. As shown in the figures, the depth of the cassette receiving box composed of cassette holder 41 and top plate 42 is greater than the depth of cassette by an amount a as shown in FIG. 3A. This clearance is provided for permitting the cassette to float up from cassette holder 41 and to move to a predetermined position and to a height relative to the apparatus body, when cassette holder 41 containing a cassette is loaded into the apparatus body.

First, a case of regular insertion of a small size cassette will be described. As shown in FIG. 1A, small size cassette 5 is inserted with its left side surface being aligned with the left side inner surface of cassette holder 41. In this case, since small size cassette 5 does not make contact with opener roller 75 of guide opener 70, small size cassette guide member 58 remains at a position shown in FIG. 3A, and also in FIG. 1A and FIG. 2, and side surface 58a of guide member 58 guides one side surface of small size cassette 5. Meanwhile, erroneous insertion preventing member 52 is rotated upwards, as shown in FIG. 4A, by slant surfaces 39a, 39b of a front lid 39 of small size cassette 5, and a pawl 52a of erroneous insertion preventing member 52 is prevented from engaging with a step 40a of small size cassette 5. Thus, small size cassette 5 slides under pawl 52a and is inserted until it abuts against stoppers 44, 45 of cassette holder 41. In the above-mentioned inserting operation, small size cassette locking roller 68 of small size cassette guide member 58 rolls on the right side wall of cassette to the above-mentioned position where locking roller 68 engages with a grip groove 37 of cassette for locating the cassette at a regular position. Further, in order to prevent pawl 52a of erroneous insertion preventing lever 52 from making contact with the upper surface of the cassette 5 and scratching the same, or from falling into any recess on the cassette and hindering insertion of the cassette, an arcuate projection 52b is provided rearward of pawl 52a and directly slides on the cassette, thereby producing a gap b between pawl 52a and the upper surface of the cassette.

Although not referred to the above description, the other erroneous insertion preventing lever 53 has the same structures and functions as those of lever 52.

Next, the case of inserting a large size cassette will be described below. As shown in FIG. 3A, large size cassette 1 is inserted over the front portion of cassette holder 41. First, front portion 31a of large size cassette 1 makes contact with opener roller 75 rotatably supported by guide opener 70 and rotates guide opener 70 in a clockwise direction viewed in FIG. 3A. In this operation, a projection 73 formed on guide opener 70 moves upwards as sliding in a groove 58g of small size cassette guide member 58, thereby rotating small size cassette guide member 58 in a counterclockwise direction as shown in FIG. 3C and locating the flat tip portion 58c of small size cassette guide member 58 sufficiently apart from the front portion of the cassette. When insertion of large size cassette 1 is continued from a position indicated in FIG. 3C with two dot chain line, a chamfer-like slant portion 31b formed on a lid 31 of large size cassette 1 pushes pawl 58d of small size cassette guide member 58, preventing any engagement between the pawl and the cassette, and rotates small size cassette guide member 58 in a counterclockwise direction into a position above cassette as shown in FIG. 3B. Then, the cassette is inserted farther until it abuts against stoppers 43, 44, 45.

The height c of pawl 58d on small size cassette guide member 58 is smaller than the depth d of the chamfer-like slant surface of lid 31 of large size cassette 1. Rearward of pawl 58d is provided an arcuate surface 58e as shown in FIG. 1C for producing a contact relation in a sliding manner between the upper surface of the cassette and small size cassette guide member 58. In the situation shown in FIG. 3B, arcuate surface 58e makes contact with the upper surface of the cassette and a gap e exists between pawl 58d and the upper surface of cassette, thereby preventing the pawl from interfering with the upper surface of the cassette.

The function of small size cassette retaining roller arm 61 in relation to the above-mentioned handling of the cassette will be described below. When small size cassette guide member 58 rotates in a counterclockwise direction viewed in the figure, a roller arm 61 mounted with a roller 62 receives a rotating force from the guide member 58 through a pin 63 engaging with a recess 58f of small size cassette guide member 58, and rotates against the force of spring 64 to a position where roller 62 is apart from the upper surface of cassette as shown in FIG. 3B.

The cassette urging force is required, in general, so as to be as great as several hundred grams, and acts, in a conventional device, on the substantially central portion of the large size cassette. In the present invention, the cassette urging force is applied on the central portion of large size cassette through arcuate surface 58e of small size cassette guide member 58, and is rather small, because the spring force is transmitted to the cassette as being reduced in a ratio depending on the moment arms about pin 59. Namely, the force acting on the central portion of large size cassette during insertion of the cassette is in a range from one third to one fifth of that assumed in the prior art, even though the forces of the other springs 67 and 72 are added thereto, i.e. actually smaller than 100 grams. As a result, the risk of cassette deformation due to the urging force is avoided.

In the above, regular insertion of small size cassette and large size cassette has been described. Next, a cassette regularly inserted into cassette holder is loaded into an apparatus body through an action of lowering the cassette holder to the apparatus body side. This loading operation can be easily carried out by using conventional means such as a linkage mechanism, although the structural detail of the means is not described here.

When the above-mentioned cassette loading has been completed, the cassette is correctly supported by the position locating members provided in the apparatus body as being floated from the cassette holder. Small size cassette 5 is urged toward the above-mentioned position locating members by means of cassette retaining lever 47 and small size cassette retaining roller arm 61, while large size cassette 1 is urged toward the position locating members by means of cassette retaining levers 46 and 47.

Next, a case where small size cassette is being inserted with an initial positional deviation from the regular insertion position will be described below. In case small size cassette 5 is slightly deviated rightwards, namely, rightwards by a distance smaller than distance f indicated in FIG. 1B where the cassette makes contact with opener roller 75 of guide opener 70, cassette 5 is guided to the regular position by the slant surface 58b of small size cassette guide member 58. Flat portion 58c formed on the tip of small size cassette guide member 58 is provided for preventing small size cassette 5 from moving upwards due to slant surface 39b of small size cassette 5, and has a depth greater than the depth g of the slant surface 39b of small size cassette 5. As a result, in the case of small size cassette being inserted with some lateral deviation, small size cassette front surface 39c abuts against the flat surface 58c of small size cassette guide member 58, thereby preventing upward motion of small size cassette guide member 58, and the cassette is guided to a regular position by virtue of slant surface 58b, as mentioned above.

Next, such a case that a small size cassette 5 is further deviated in start of insertion over the distance f shown in FIG. 1B, and engages with opener roller 75 of guide opener 70 in a rolling manner will be described below. In this case, small cassette guide member 58 is rotated upwards similarly to the above-mentioned case of large size cassette insertion. However, when small size cassette is further inserted, a step portion of small size cassette defined by front lid 39 and rear lid 40, namely, a step surface 40a of rear lid 40 abuts against a pawl 58d formed on the lower surface of small size cassette guide member 58, thereby preventing a farther insertion of the cassette beyond the position shown in FIG. 3C. Further, in this case, the above-mentioned erroneous insertion preventing lever 52 makes contact with small size cassette 5 in a range out of slant surface 39b of front lid 39 of small size cassette 5, and accordingly, the above-mentioned step 40a engages with pawl 52a of erroneous insertion preventing lever 52, thereby preventing erroneous insertion of small size cassette in cooperation with the above-mentioned pawl 58d of guide member 58. Thus, erroneous insertion of small size cassette 5 is prevented.

Figure 12:
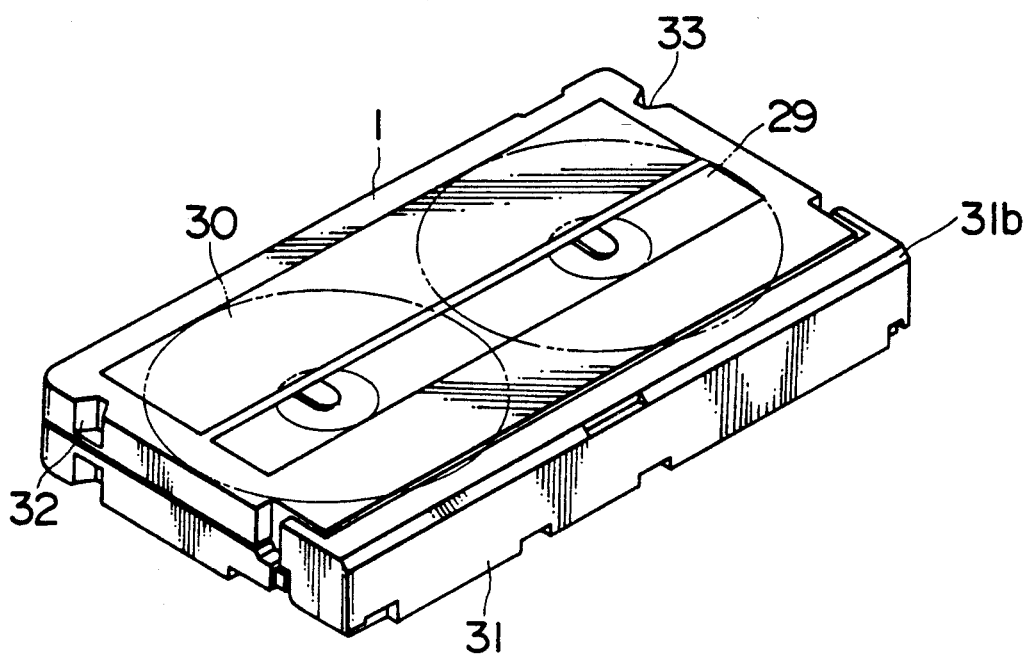
FIG. 12 is a perspective view illustrating a large size tape cassette observed at the rear surface thereof.
Figure 13:
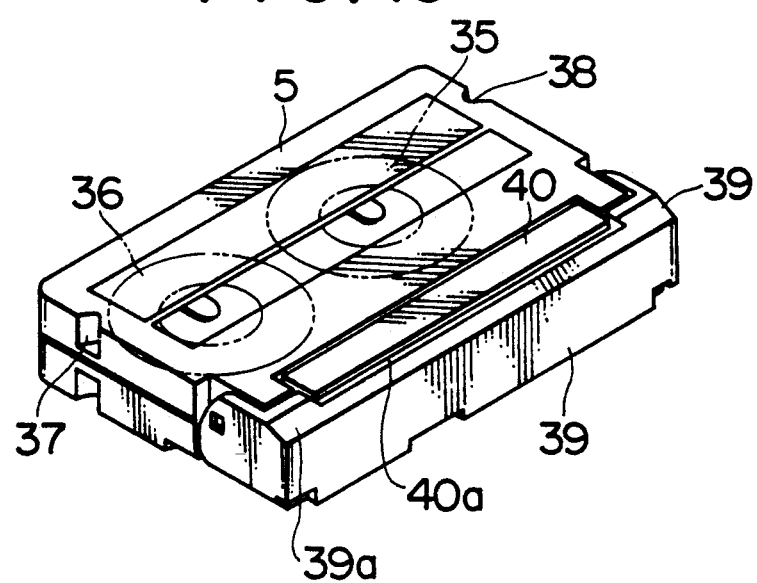
FIG. 13 is a perspective view illustrating a small size tape cassette observed at the front surface thereof.

Erroneous insertion preventing levers 52, 53 are provided for preventing a cassette from being erroneously inserted in an inverted posture. Large size cassette 1 and small size cassette 5 are formed, as shown in FIGS. 12 and 13, with a chamfer-like slant surface 31b and chamfer-like slant surfaces 39a, 39b, respectively, on their respective front portions viewed in an inserting direction. By virtue of this arrangement, when a cassette is going to be inserted in an inverted posture with respect to the front and rear or to the top and bottom, the pawl 52a of the erroneous insertion preventing lever engages with an edge of the respective cassette, thereby preventing erroneous insertion of a cassette.

Figure 5A:
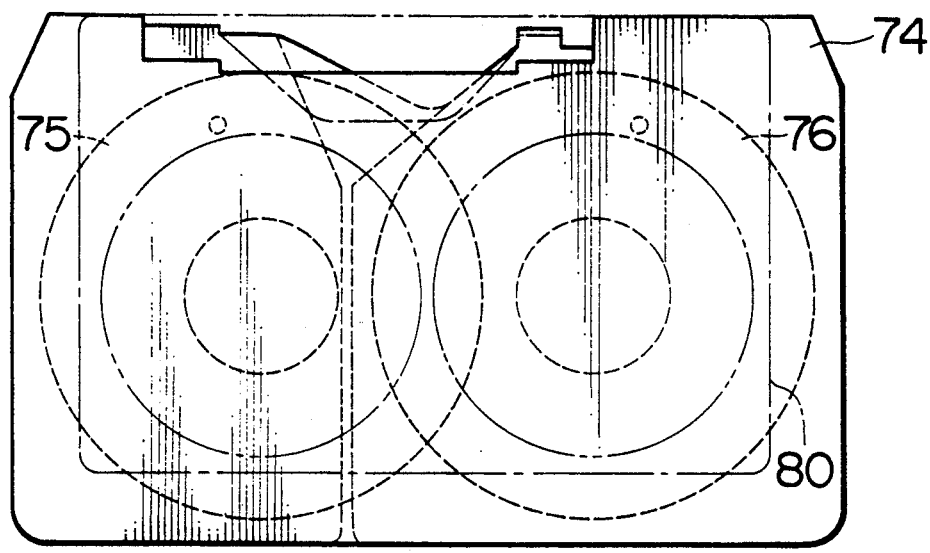
FIGS. 5A and 5B are views illustrating another examples of large and small size tape cassettes.
Figure 5B:
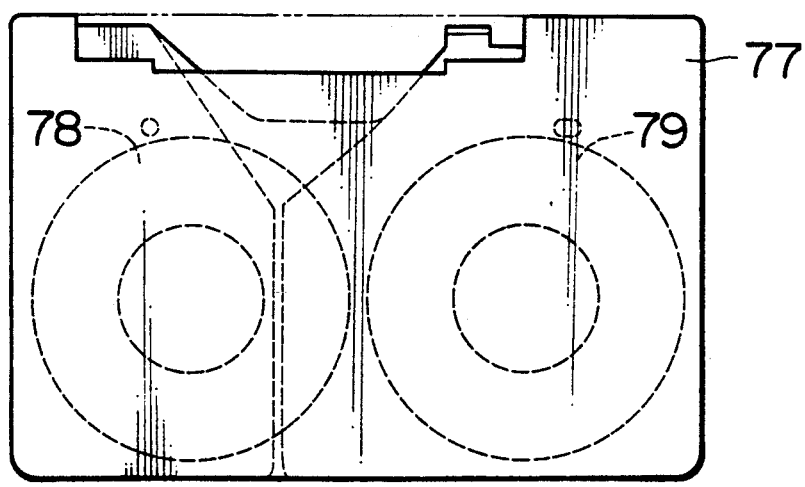
Figure 10A:
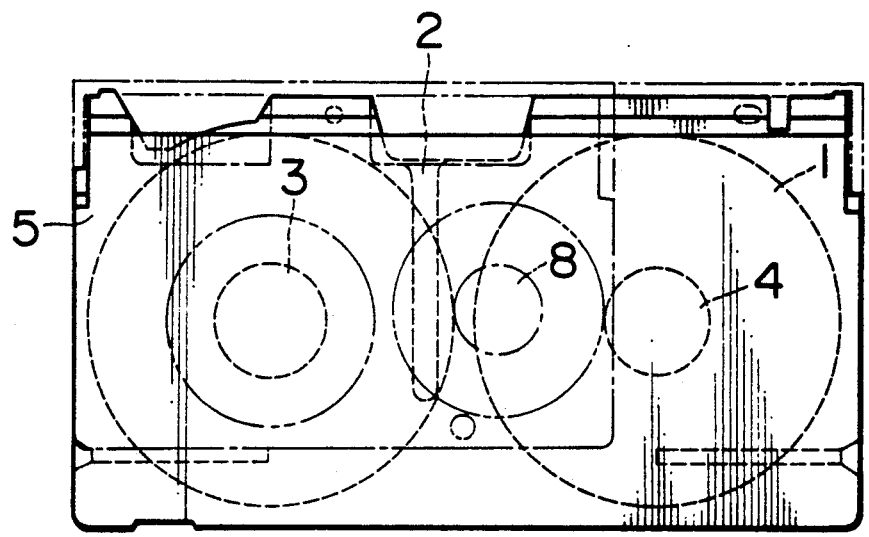
FIG. 10A and 10B are front and side views, respectively, illustrating the cassette holder device in positional relation to the large and small size tape cassettes.
Figure 10B:
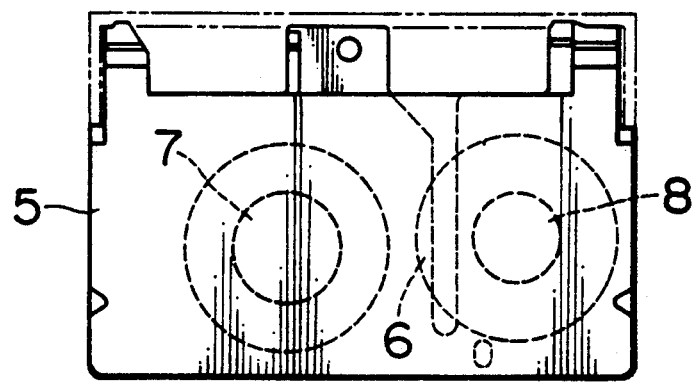
Figure 11A:
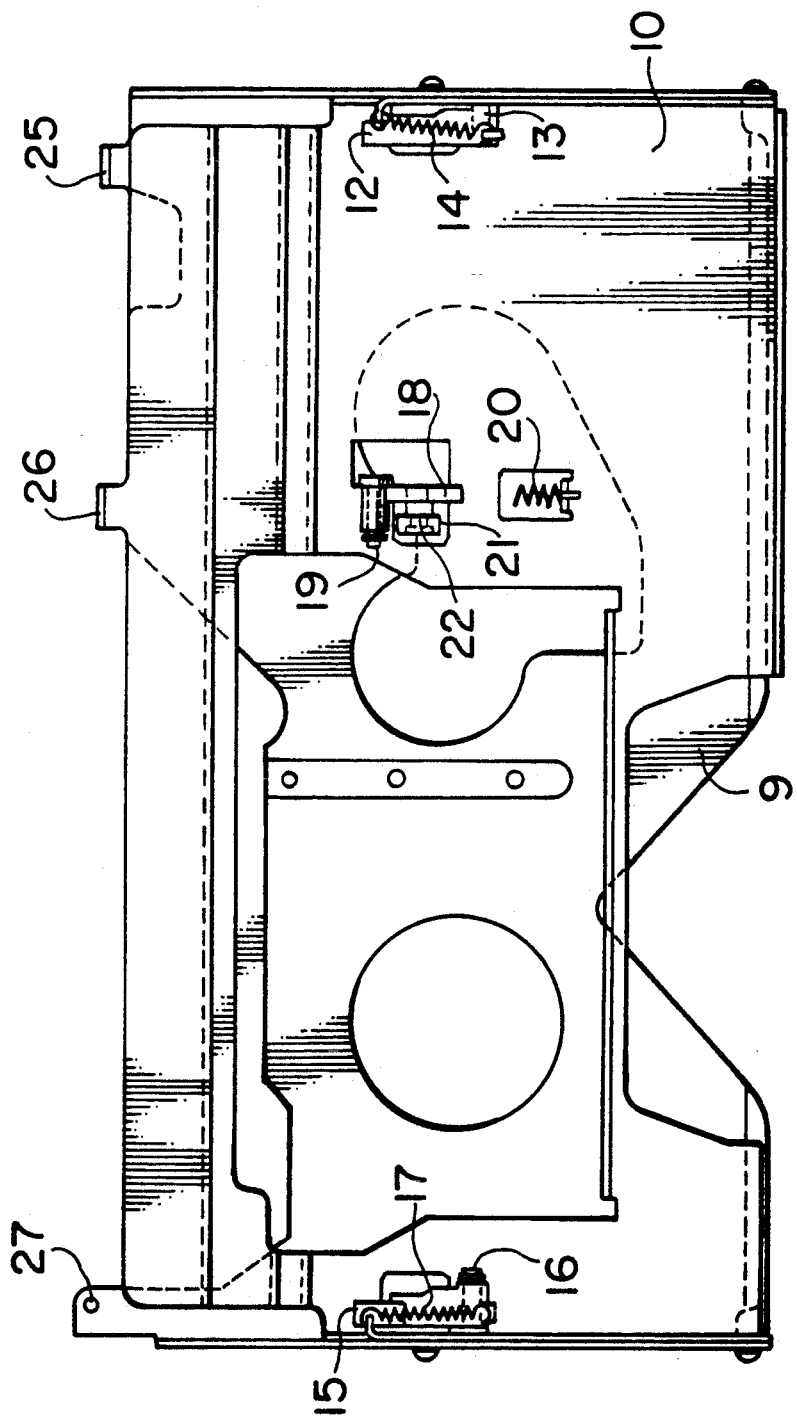
FIGS. 11A through 11C are plan, front and side views, respectively, illustrating a conventional cassette holder device.
Figure 11B:
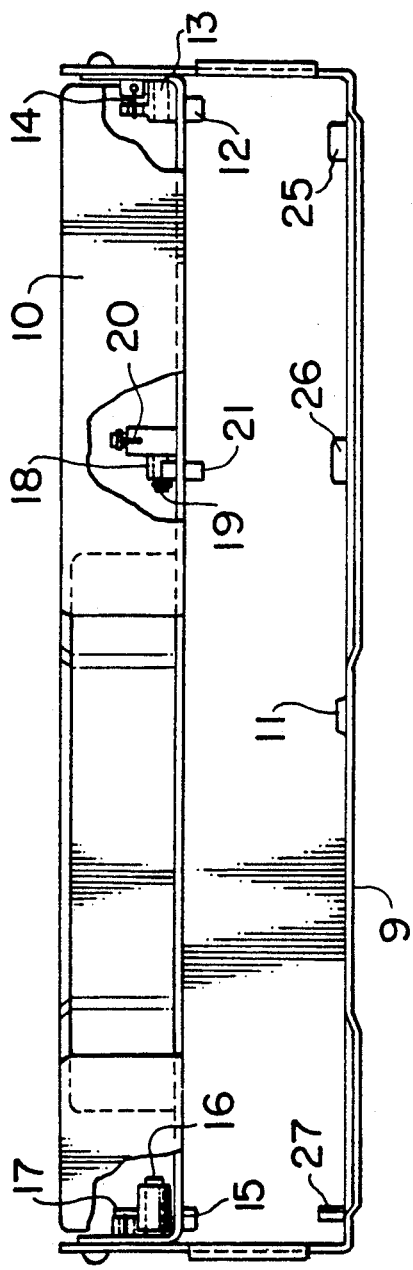
Figure 11C:
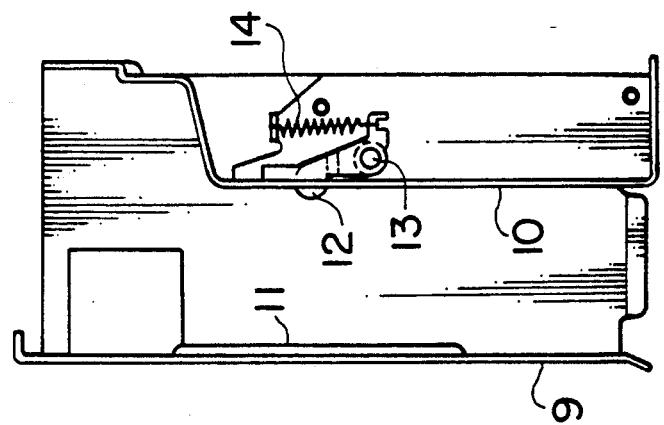

Although, in this embodiment only one small size cassette guide member 58 is provided and the small size cassette is located in the cassette holder as if its left side surface and its front side surface are aligned with those of large size cassette, respectively, as shown in FIGS. 10A and 10B, it is also possible to locate the small size cassette in such a condition that its middle line in the breadth and its front surface are aligned with those of the large size cassette, respectively, as shown in FIGS. 5A and 5B. In this case, on each side of the small size cassette is arranged a small size cassette guide member 58 and a guide opener 70, although the detail of this arrangement being not described here.

Further, it will be easily understood that the concept of the present invention can be applied to a cassette holder device which is adapted to accommodate three kinds of cassettes having different sizes.

In FIGS. 5A and 5B, large size cassette 74 contains tape reels 75 and 76, while small size cassette 77 contains reels 78 and 79. In the figure, imaginary line 80 denotes the position of small size cassette relative to large size cassette.

Figure 6:
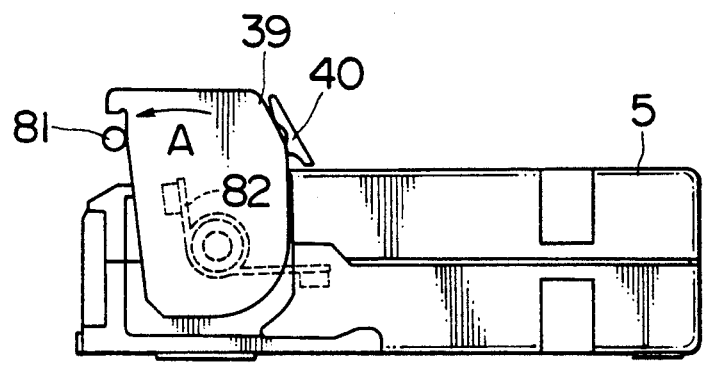
FIG. 6 is a side view illustrating a small size tape cassette having its lid opened.

FIG. 6 shows a state of small size cassette 5 when loaded into an apparatus body such as VTR. Front lid 39 and rear lid 40 both provided on the front surface of small size cassette 5 are rotated, in connection with a cassette loading action, to the shown open positions by means of a lid opening pin 81 fixed to a cassette holder supporting member not shown. On the other hand, if the cassette is not loaded into an apparatus body, the lids are maintained in closed positions at all times by means of a spring 82 provided between front lid 39 and cassette case 34. In consequence, in the situation shown in FIG. 6, cassette 5 receives a reaction force from pin 81 through lid 39 in the direction shown in the figure with the arrow A. This reaction force is generated when the lid starts to be opened and continues to exist as far as the lid urges pin 81, thereby being apt to cause a positional shift of the cassette in cassette holder 41. In order to prevent this shift of the cassette, there is provided a small size cassette locking roller 68 mounted on small size cassette guide member 58, which is shown in FIG. 7.

Figure 7:
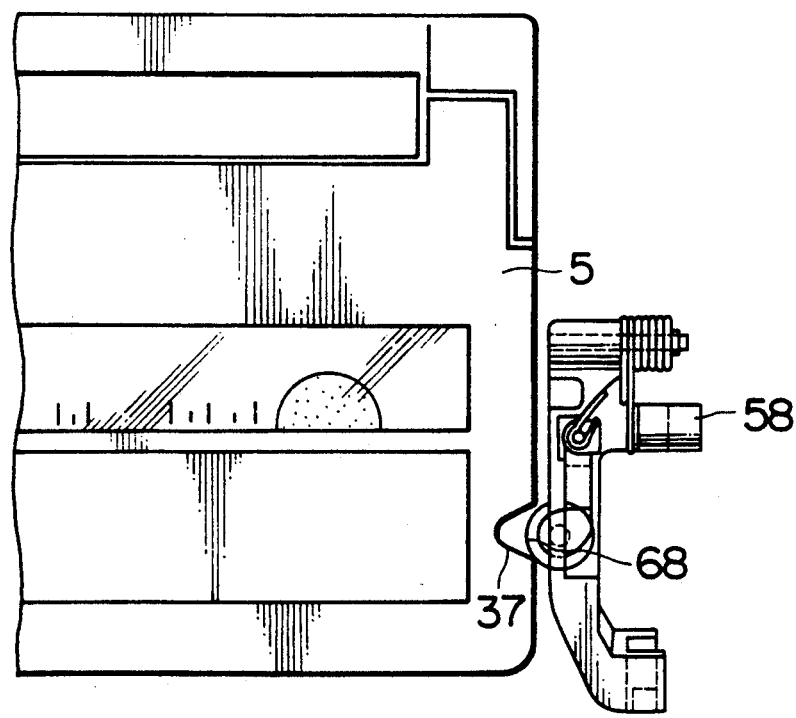
FIG. 7 is a front view illustrating the engagement between a grip groove in the small size tape cassette and the small size tape cassette locking roller.
Figure 8:
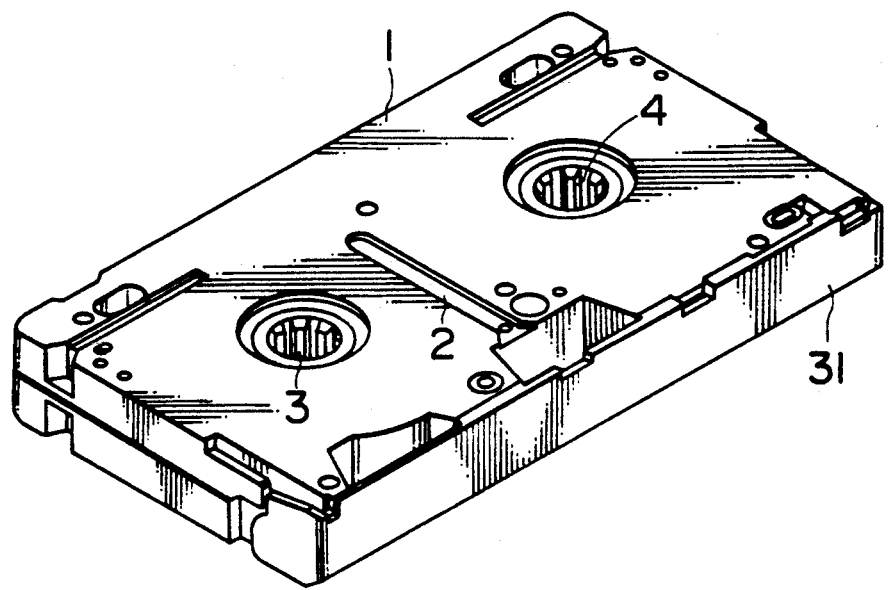
FIG. 8 is a perspective view of the small size tape cassette observed at the rear side surface thereof.
Figure 9:
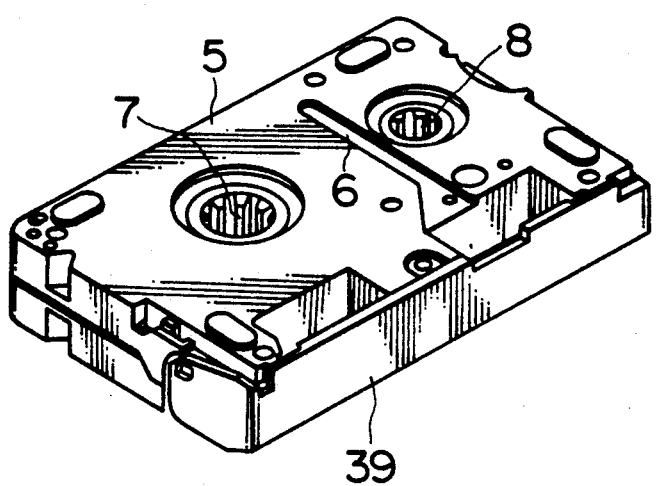
FIG. 9 is a perspective view illustrating the small size tape cassette observed at the rear surface of the same.

FIG. 7 shows a relation between small size cassette locking roller 68 and grip groove 37 of small size cassette when small size cassette is inserted into the cassette holder. As shown in the figure, small size cassette locking roller 68 engages with grip groove 37, thereby preventing a positional shift of small size cassette.

As mentioned above, according to the present invention, by virtue of the erroneous insertion preventing lever biased by a rotating force and located in the upper portion of the cassette holder, erroneous insertion of the cassette in an inverted posture can be surely prevented. In addition, the cassette holder is protected from being deformed or damaged even when the cassette is inserted by a rather strong force.

Further, in correct insertion of the cassette, the pawl of the erroneous insertion preventing lever is located apart from the upper surface of the cassette, protecting the cassette from being scratched, preventing production of scratch chips and drop-out of information.

In addition, since the cassette does not receive any strong force which may be caused in the case of erroneous insertion with an inverted posture of the cassette, the cassette is protected from being deformed. In consequence, components in the cassette for controlling a tape running, such as guide posts, can maintain their precise positions and attitudes, resulting in an improved performance of the apparatus such as a VTR.

Further, since the step portion of the erroneous insertion preventing lever does not make contact with the upper surface of the cassette, the cassette is not only inserted smoothly, but also prevents the upper surface thereof from being scratched.

Further, in the case of a cassette having a slant surface provided only in a part of the upper front portion of cassette being used, it is possible to prevent erroneous insertion where the cassette is deviated laterally. In consequence, there is obtained a cassette holder device which surely and easily receive more than two kinds of cassettes having different sizes.

What is claimed is:

1. A cassette holder device having a cassette holder member capable of receiving a tape cassette having upper and lower surfaces, side surfaces, front and rear surfaces, a slant surface between said front surface and said upper surface, said lower surface and said front, rear and side surfaces defining therebetween a bottom peripheral edge while said upper surface and said rear surface and said side surfaces defining therebetween a top peripheral edge, and said slant surface and said upper surface defining therebetween a step part, for loading the cassette into an apparatus body and taking out the cassette from the apparatus body, said cassette holder member having an upper portion, at least one erroneous insertion preventing lever rotatably mounted on the upper portion of the cassette holder member and urged toward the cassette for preventing an erroneous insertion of the cassette, said erroneous insertion preventing lever having a lower projecting surface, said erroneous insertion preventing lever being formed with a pawl and an arcuate projection on the lower projecting surface thereof, and being normally rotated to a position where said pawl locates lower than the upper surface of the inserted cassette, said pawl having a surface parallel to the front surface of the inserted cassette so as to check said top or bottom peripheral edge of the inserted cassette which is vertically or longitudinally inverted, said arcuate projection being adapted to make contact with the upper surface of the cassette so as to prevent said pawl from being made into contact with the upper surface of the cassette during normal insertion of the cassette.

2. A cassette holder device as set forth in claim 1, wherein said pawl having a lowermost tip end, and said erroneous insertion preventing lever is rotated upward by said slant surface of the cassette when the latter is shifted laterally, to a position where said tip end of the pawl locates below said upper surface of said cassette, whereby said tip end of the pawl checks said step of the cassette when said cassette is inserted laterally shifted.

* * * * *